(12) United States Patent
Heisler, Jr.

(10) Patent No.: US 10,083,557 B1
(45) Date of Patent: *Sep. 25, 2018

(54) APPARATUS AND METHOD FOR A BALCONY ACCESS STATUS ALERT SYSTEM

(71) Applicant: Jerome S. Heisler, Jr., Chadds Ford, PA (US)

(72) Inventor: Jerome S. Heisler, Jr., Chadds Ford, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,406

(22) Filed: Jan. 9, 2018

Related U.S. Application Data

(63) Continuation-in-part of application No. 15/497,975, filed on Apr. 26, 2017, now Pat. No. 9,898,905.

(51) Int. Cl.
*G08B 7/06* (2006.01)
*H04W 4/12* (2009.01)
(Continued)

(52) U.S. Cl.
CPC ............ *G07C 9/00119* (2013.01); *G08B 7/06* (2013.01); *H04W 4/021* (2013.01); *H04W 4/12* (2013.01)

(58) Field of Classification Search
CPC . E04G 21/32; E04G 21/3204; E04G 21/3223; E04G 21/3228; E04G 21/3233;
(Continued)

(56) References Cited

U.S. PATENT DOCUMENTS 4,231,030 A 10/1980 Weiss
4,281,320 A 7/1981 Rosenberg
(Continued)

FOREIGN PATENT DOCUMENTS

AU 2016101671 A4 * 10/2016 ............ G08B 21/02
CN 203614000 U 5/2014
(Continued)

OTHER PUBLICATIONS

"Model 1106 Universal Transmitter", Digital Monitoring Products, https://buy.dmp.com/dmp/Shop?DSP=30100&PCR=1:100:10012:10119 &IID=1106-W, Jan. 25, 2017.
(Continued)

*Primary Examiner* — Brian Wilson
(74) *Attorney, Agent, or Firm* — Caesar Rivise, PC

(57) ABSTRACT

A barrier that is releasably secured across an ingress/egress to a balcony or other elevated platform. The barrier is a fence-style assembly that has a pair of vertical posts that are releasably secured within respective boots secured to the floor. One of the boots includes a switch-activated transmitter that is inactive when the respective post is seated in the boot. If the post is pulled out of the boot, the switch-activated transmitter transmits a wireless signal to a transceiver located on the barrier which then transmits a signal to an on-site controller that transmits respective text messages to authorized personnel informing them of the barrier removal and restoration and will continue to do so until the barrier status changes. The transceiver may be housed within a housing that also contains a visual and/or audible warning at the barrier vicinity to warn those in the vicinity of the barrier removal.

21 Claims, 9 Drawing Sheets

(51) Int. Cl.
*G08B 13/02* (2006.01)
*G07C 9/00* (2006.01)
*H04W 4/021* (2018.01)

(58) Field of Classification Search
CPC ........ E04G 2021/3257; G07C 9/00119; G08B 7/06; G08B 13/02; G08B 13/06; G08B 13/08; G08B 13/10; G08B 13/14; H04W 4/12; H04W 4/021
See application file for complete search history.

(56) References Cited

U.S. PATENT DOCUMENTS

| | | |
|---|---|---|
| 4,644,329 A | 2/1987 | Brueske |
| 4,870,404 A | 9/1989 | Husmann et al. |
| 5,334,971 A | 8/1994 | Raath |
| 5,900,815 A | 5/1999 | Story |
| 6,186,274 B1 | 2/2001 | Reynolds et al. |
| 6,575,435 B1 * | 6/2003 | Kotzen ............ E04H 4/06 160/10 |
| 6,710,717 B2 | 3/2004 | Slomowitz et al. |
| 8,256,164 B2 | 9/2012 | Cuccurullo |
| 8,502,665 B2 | 8/2013 | Boudreau |
| 8,522,487 B2 | 9/2013 | Whiting et al. |
| 2005/0024207 A1 | 2/2005 | Schebel et al. |
| 2009/0044450 A1 | 2/2009 | Hallman |
| 2010/0171085 A1 | 7/2010 | Webster, IV |
| 2011/0057788 A1 | 3/2011 | Talkington et al. |
| 2012/0255234 A1 * | 10/2012 | Wang ............ E05B 65/0007 49/395 |
| 2012/0262289 A1 * | 10/2012 | French, II ............ G08B 25/009 340/539.11 |
| 2013/0257611 A1 * | 10/2013 | Lamb ............ G08B 25/008 340/501 |
| 2015/0109104 A1 | 4/2015 | Fadell et al. |

FOREIGN PATENT DOCUMENTS

| | | |
|---|---|---|
| CN | 104747049 | 7/2015 |
| EP | 1988245 | 5/2008 |
| EP | 2224266 | 2/2010 |

OTHER PUBLICATIONS

"DMP Two-way Wireless System Offers a Competitive Edge", Digital Monitoring Products, White Paper, 2014.
"Tech Support FAQ", Digital Monitoring Products, Jan. 25, 2017.
English abstract of CN203614000U.
English abstract of CN104747049.

* cited by examiner

APPARATUS AND METHOD FOR A BALCONY ACCESS STATUS ALERT SYSTEM

CROSS-REFERENCE TO RELATED APPLICATIONS

This Continuation-in-Part application claims the benefit under 35 U.S.C. § 120 of application Ser. No. 15/497,975 filed on Apr. 26, 2017 entitled "APPARATUS AND METHOD FOR A BALCONY ACCESS STATUS ALERT SYSTEM" and whose entire disclosure is incorporated by reference herein.

BACKGROUND OF THE INVENTION

The present invention relates in general to safety barriers and, more particularly, to a safety barrier used to impede ingress/egress to balconies or other elevated platforms under construction and to automatically text remotely-located authorized personnel when the barrier is removed and when it is restored.

During the construction of a structure that may comprise a height from which a person could be injured from a fall, ingress/egress to an unfinished balcony or other elevated platform on an upper story or other elevated level poses a hazard to personnel working on or around that structure. A worker could inadvertently fall through an incomplete portion of the balcony, or fall over its edge if no bannister has been erected along the perimeter of the balcony, etc. Typical precautions that are taken are to place "limit of disturbance" (LOD) mesh at the ingress/egress to the balcony or other elevated platform to warn those in the vicinity that passage through the ingress/egress should be avoided. However, the LOD does not provide any actual "barrier" to prevent passage and someone could easily push aside the LOD and proceed. Furthermore, even if a barrier were erected at the ingress/egress, if someone were successful in removing it, there would be no way to either remind that person to restore the barrier, or if removed illicitly, to alert authorized personnel to its removal and to take immediate action to restore the barrier.

Thus, there remains a need for automated alert system and method that can immediately detect the removal of a barrier to an ingress/egress of an elevated balcony or other platform and to provide remotely-located authorized personnel with an alert that the barrier has been removed and to continue that alert until the barrier is restored while also providing a "local" alert to personnel in the ingress/egress vicinity of the danger posed by the removed barrier. The system and method also needs to provide an automatic indication when the barrier is restored.

All references cited herein are incorporated herein by reference in their entireties.

BRIEF SUMMARY OF THE INVENTION

A barrier status alert system for use at an opening to a balcony to alert authorized personnel, remote from the balcony, that a barrier has been removed at the opening is disclosed. The system comprises: a barrier that is adapted to be installed or removed from a position at the opening of the balcony and wherein the barrier prevents passage of a person through the opening; a detector that determines that the barrier has been removed from the position in front of the balcony, wherein the detector transmits a first wireless signal upon the removal of the barrier; a transceiver which receives the first wireless signal, and wherein the transceiver transmits a second wireless signal to an on-site controller; and wherein the on-site controller transmits a third wireless signal (e.g., text alerts, etc.) to at least one wireless device (e.g., a cellphone, a smartphone, computer tablet, etc.) of at least one authorized personnel (e.g., an on-site safety manager, superintendent, etc.) indicating that the barrier has been removed.

A method for providing a status alert of a barrier installed for use at an opening to a balcony in order to alert authorized personnel, remote from the balcony, that the barrier has been removed from the opening is disclosed. The method comprises detecting the removal of the barrier at the opening using a detector, wherein the barrier prevents passage of a person through the opening when present at the opening; transmitting a first wireless signal whenever the detector has detected that the barrier has been removed from the position in front of the balcony; receiving the first wireless signal by a transceiver wherein the transceiver transmits a second wireless signal to an on-site controller; and receiving the second wireless signal by the on-site controller wherein the on-site controller transmits a third wireless signal (e.g., text alerts, etc.) to at least one wireless device (e.g., a cellphone, a smartphone, computer tablet, etc.) of at least one authorized personnel (e.g., an on-site safety manager, superintendent, etc.) that the barrier has been removed.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
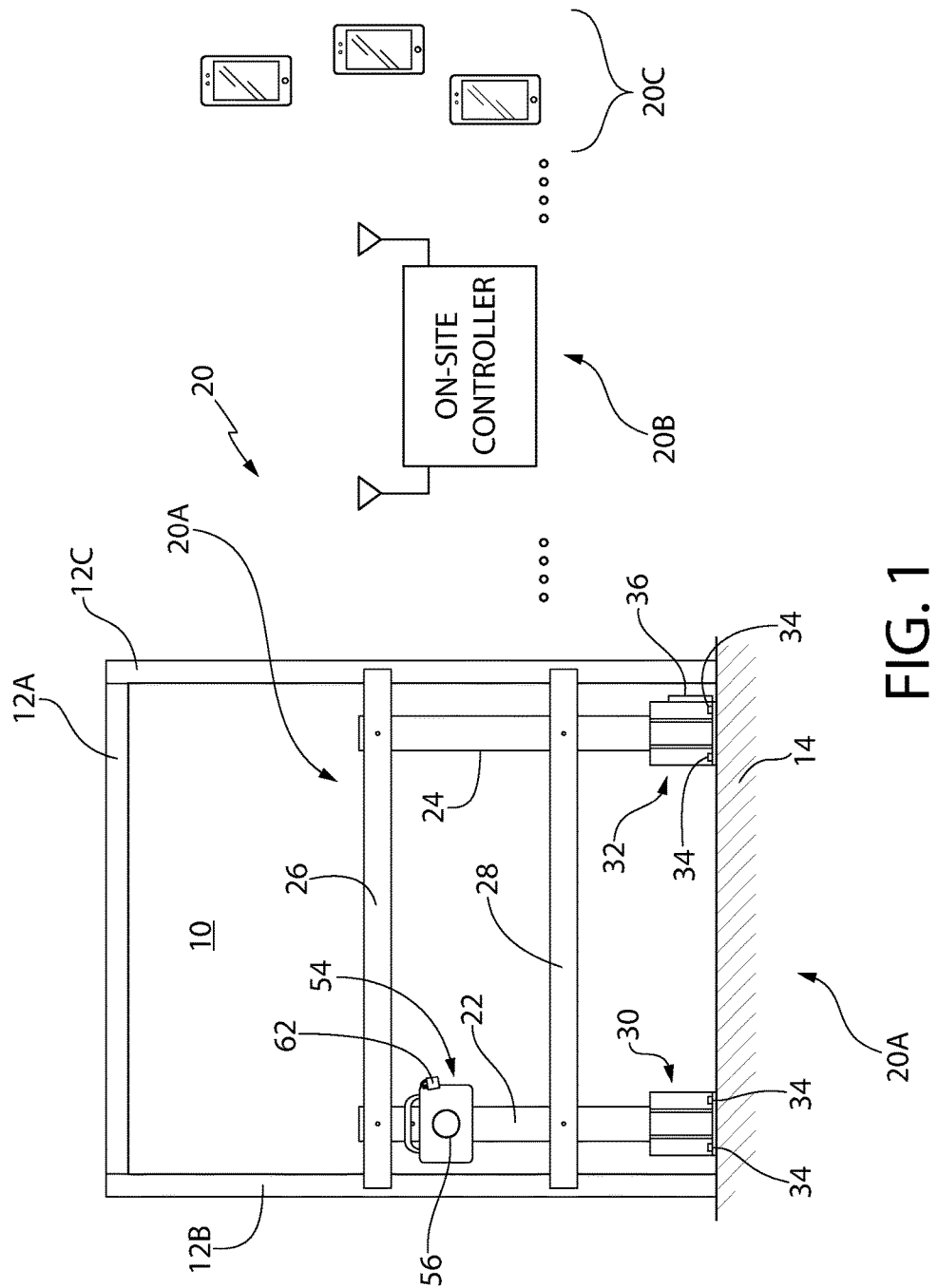
FIG. 1 is a diagram of the system of the balcony access status alert system (BASAS) showing the barrier installed in front of the balcony, the onsite controller and the wireless devices of the authorized personnel.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

As shown in FIG. 1, the system and method 20 of the present invention (also referred to as the "balcony access status alert system, BASAS") comprises a barrier 20A installed in front of the ingress/egress 10 (hereinafter, "opening 10") to a balcony (or other elevated platform), an on-site controller 20B (e.g., a DMP-XTLC-Wireless Control Panel, etc.) and at least one wireless communication device 20C (e.g., a cellphone, a smartphone, computer tablet, etc.). As will be discussed in detail later, if the barrier 20A is ever removed from its location in front of the balcony opening 10, a wireless signal is transmitted from the barrier 20A to the on-site controller 20B which in turn transmits warnings (e.g., text alerts, etc.) to at least one wireless device 20C of at least one authorized person (e.g., an on-site safety manager, superintendent, etc.) to take the appropriate action to restore the barrier 20A or otherwise coordinate actions to secure the balcony opening 10.

Figure 4A:
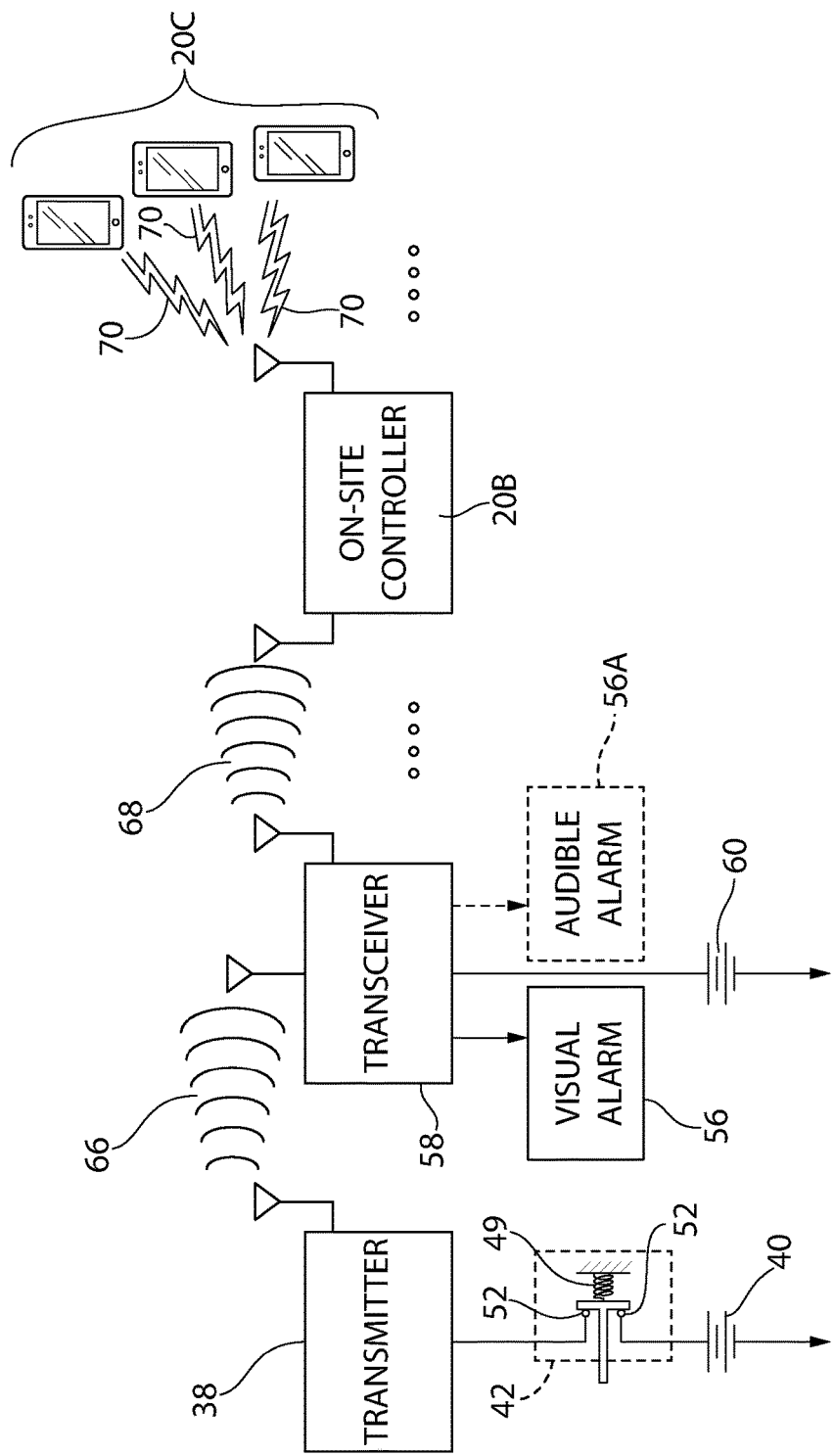
FIG. 4A is a block diagram of the wireless portion of the system of the present invention depicting its operation when the barrier posts are removed from their respective boots.
Figure 4B:
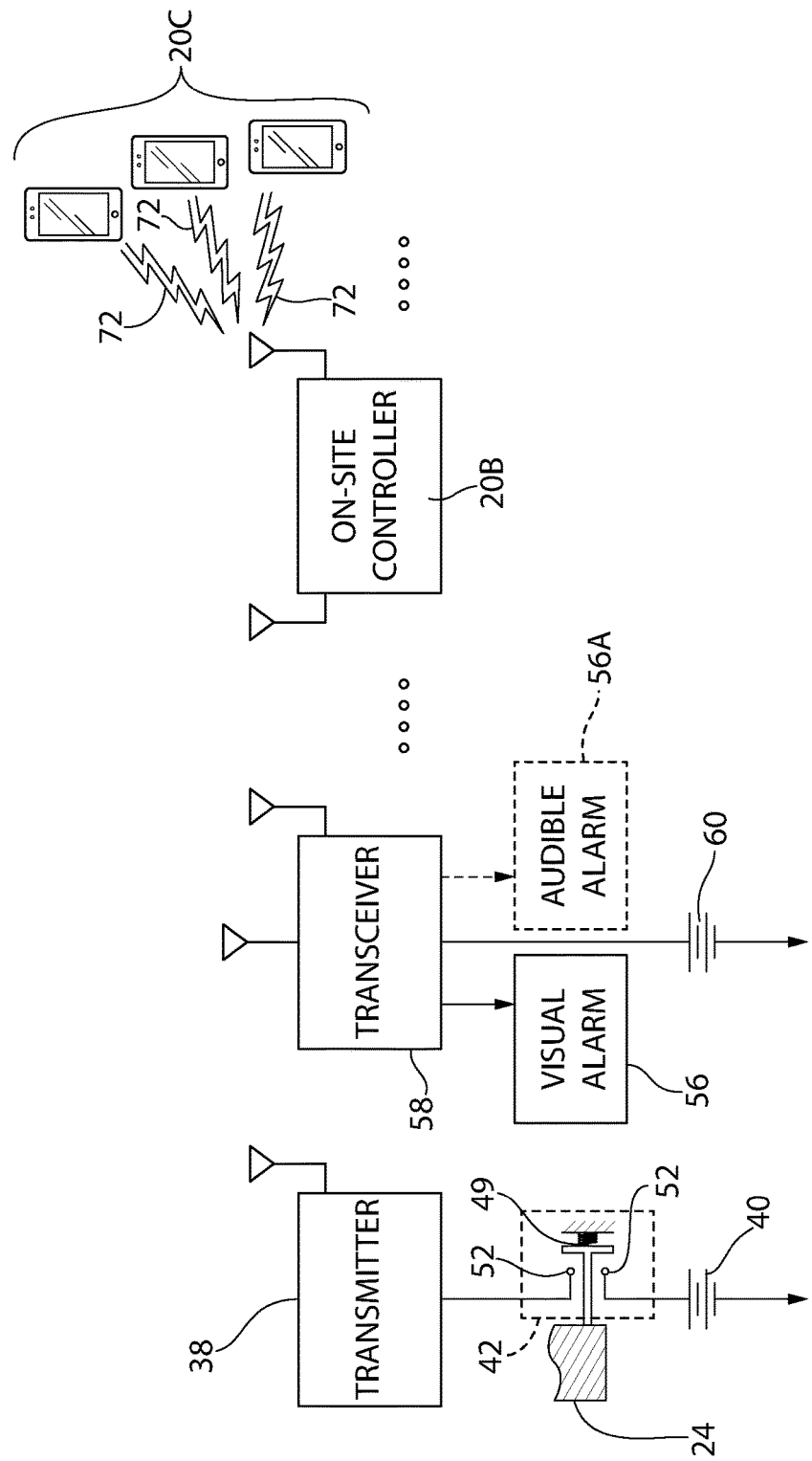
FIG. 4B is a block diagram of the wireless portion of the system of the present invention depicting its operation when the barrier posts are restored to their respective boots.

It should be understood that the term "on-site controller" 20B is a device that is located on a site where construction is on-going but that the controller 20B itself may be located remotely from the actual barrier(s) 20A/opening(s) 10, as indicated by the "dots" in FIGS. 1 and 4A-4B. Similarly, "on-site personnel" may be located at the site where construction may be occurring but they also may be remote from the actual barrier(s) 20A/opening(s) 10. Thus, by way of example only, construction work may be occurring at particular units in a residential housing facility ("site") that is already occupied; as a result, certain authorized personnel can be present anywhere at the site but remote from any of the barrier(s) 20/opening 10 and thus are unaware of the particular status of the barriers 20A. The BASAS 20 provides the requisite status automatically to these authorized personnel, as is discussed below.

Furthermore, it should be understood that the following discussion is directed at a single barrier 20A/opening 10 but that is by way of example only. A plurality of barriers 20A/openings 10 can be monitored by the BASAS 20 of the present invention and each barrier 20A has a particular identity that is provided in the signals 70 and 72 as also discussed below.

A balcony opening 10 is typically formed by a frame, e.g., studs 12A-12C and the floor 14. As shown most clearly in FIG. 2, the barrier 20A comprises a "fence-style" configuration formed of two vertical posts 22 and 24 (e.g., wood posts, metal posts, etc.) to which are secured cross beams 26 and 28 (e.g., wood beams, metal beams, etc.). The cross beams 26/28 are long enough (e.g., 8 ft) so that they are positioned over, or close to, the studs 12B and 12C, to prevent someone from trying to "squeeze" behind the barrier 20A and go through the balcony opening 10. Where wooden posts/beams are used for the barrier 20A, tamper-proof fasteners 21 (e.g., Lobe pan head screws ("star-shaped" socket)), etc.) are preferred to deter others from easily disengaging the cross beams 26/28 from the vertical posts 22/24 to enter the balcony opening 10. The bottom of each vertical post 22/24 is received in a respective receptacle 30 and 32 (e.g., an Occupational Safety and Health Act (OSHA) safety boot SB001) and each of which are fixedly secured to the floor 14 using lag bolts (two of which 34 are shown in FIG. 1), directly in front of the balcony opening 10.

Although not shown, the cross beams 26/28 may include extensions, on each end, that may project away therefrom, towards the opening frame studs 12B and 12C, respectively. This would facilitate in further deterring someone from attempting to "squeeze" behind the barrier 20A and go through the balcony opening 10.

Figure 10:
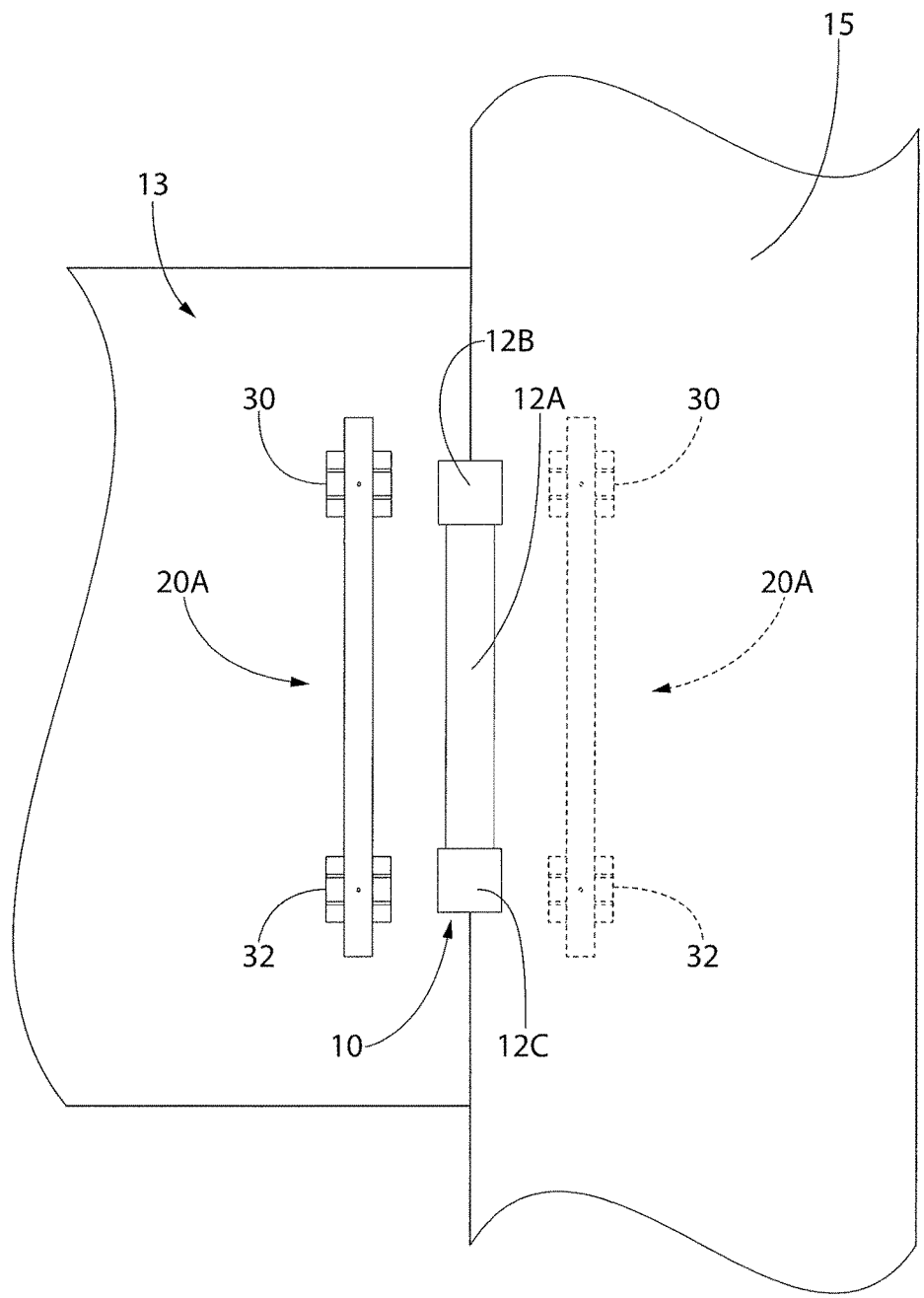
FIG. 10 is a top view functional diagram showing alternative positions of the barrier of the present invention.

FIG. 10 shows alternative positions of the barrier 20A. In particular, the barrier 20A is positioned inside the upper level structure 13 (e.g., an upper level room, etc.) at the balcony opening 10, adjacent the frame. Alternatively, the barrier 20A can also be positioned outside the upper level structure, on the balcony 15 itself, adjacent the frame, as shown in phantom. As such, the floor 14 (FIG. 1) represents the floor 14 in the upper level structure or the floor of the balcony 15.

Figure 2:
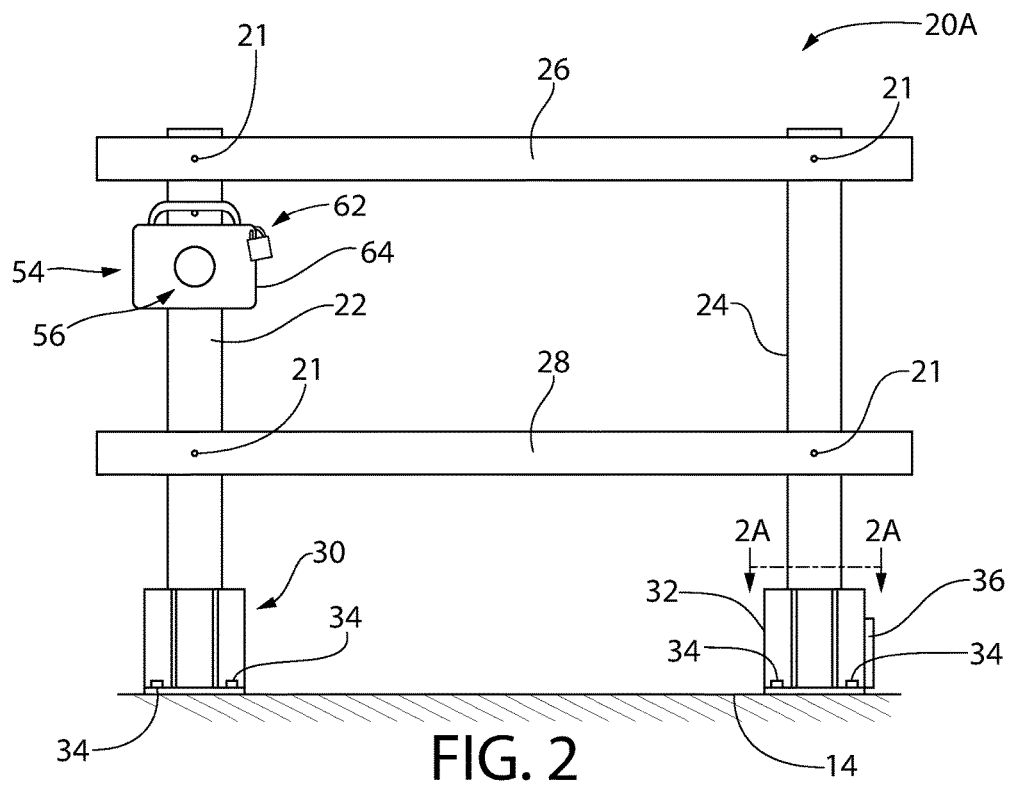
FIG. 2 is a plan view of the barrier portion of the BASAS positioned in its receptacles.
Figure 2A:
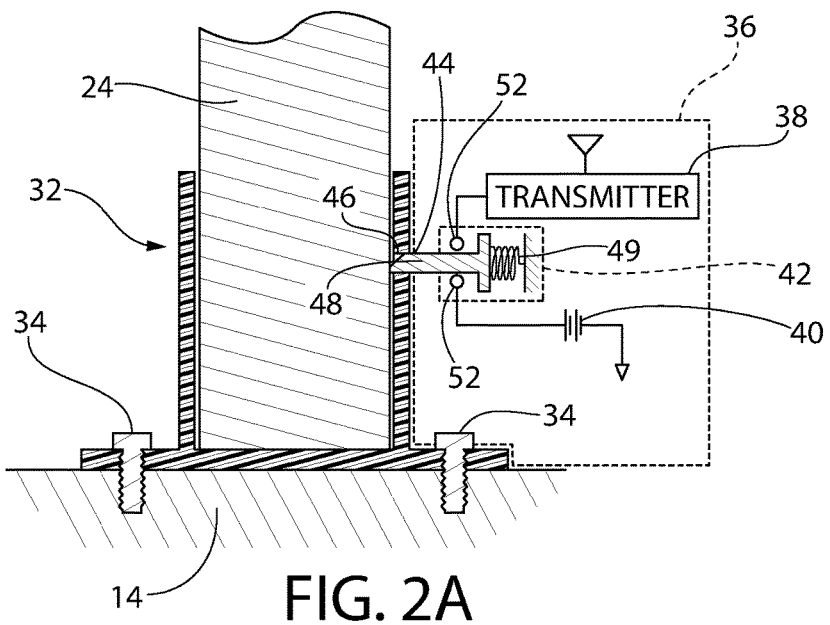
FIG. 2A is a partial functional diagram showing how the presence of the barrier post in the corresponding boot maintains the transmitter inactive.
Figure 3:
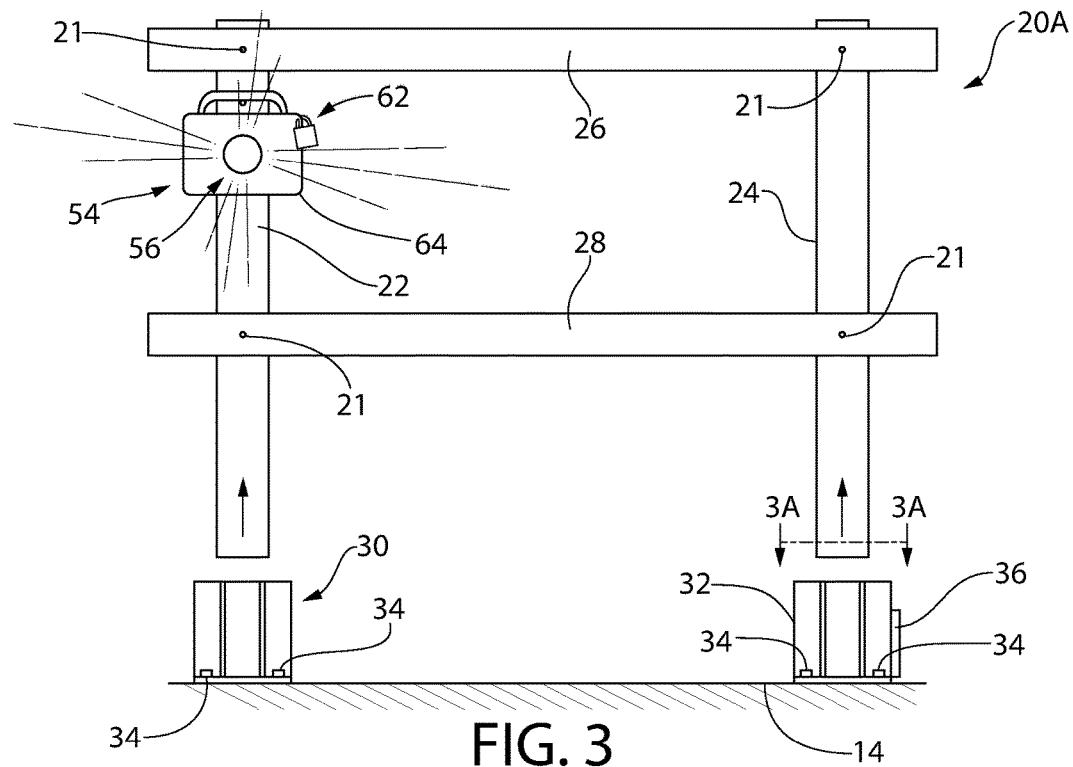
FIG. 3 shows the barrier portion of the system being removed from the respective boots.
Figure 3A:
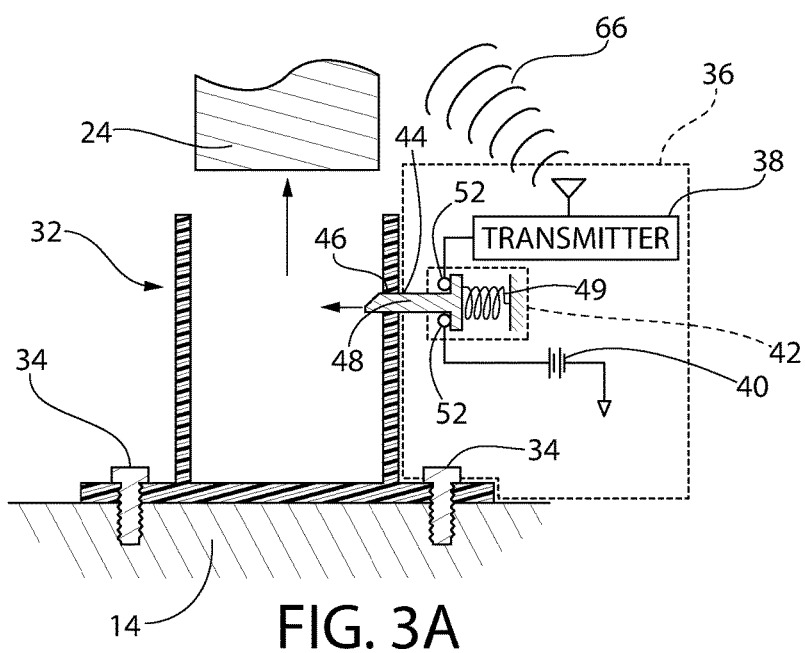
FIG. 3A is a partial functional diagram showing how the removal of the barrier post from the corresponding boot activates the transmitter.

By way of example only, a housing 36 is provided in the receptacle 32, it being understood that this housing 36 can just as easily be provided in the receptacle 30. As shown most clearly in FIG. 2A, the housing 36 comprises a transmitter 38 (e.g., DMP-1101 or DMP 1106 wireless input transmitter, etc.), a battery 40 (e.g., 3 VDC lithium battery) and a switch 42 electrically connected between the transmitter 38 and the battery 40. The housing 36 comprises an aperture 44 which aligns with an aperture 46 in the receptacle 32 through which projects a conductive switch element 48 that is biased (via a spring 49) to close contacts 52 when the bottom of the post 24 is removed from the receptacle (see FIG. 3A) and to activate the transmitter 38 to transmit a wireless signal 66 (FIGS. 3A-4). As shown in FIG. 2A, with the bottom of the post 24 inserted within the receptacle 32, the conductive switch element 48 is displaced away from contacts 52 and the transmitter 38 is thus de-energized. As such, the transmitter 38/switch 42 form a detector which determines when the barrier 20A has been removed or restored. With that said, it should be understood that it is within the broadest scope of the present invention 20 to include various types of detection schemes (e.g., proximity switches, magnetic coupling, electrical field disturbance, photoelectric detection, etc.) for detecting the removal/restoration of the barrier 20A and that the transmitter 38/switch 42 configuration disclosed herein is by way of example only.

Figure 5:
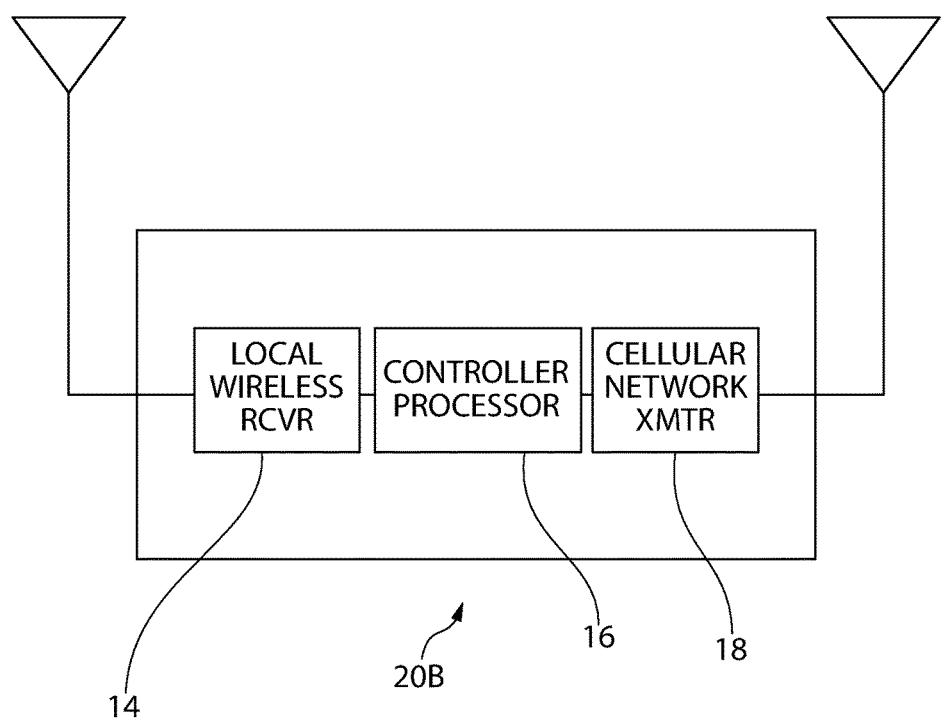
FIG. 5 is a block diagram of the on-site controller of the present invention.
Figure 6:
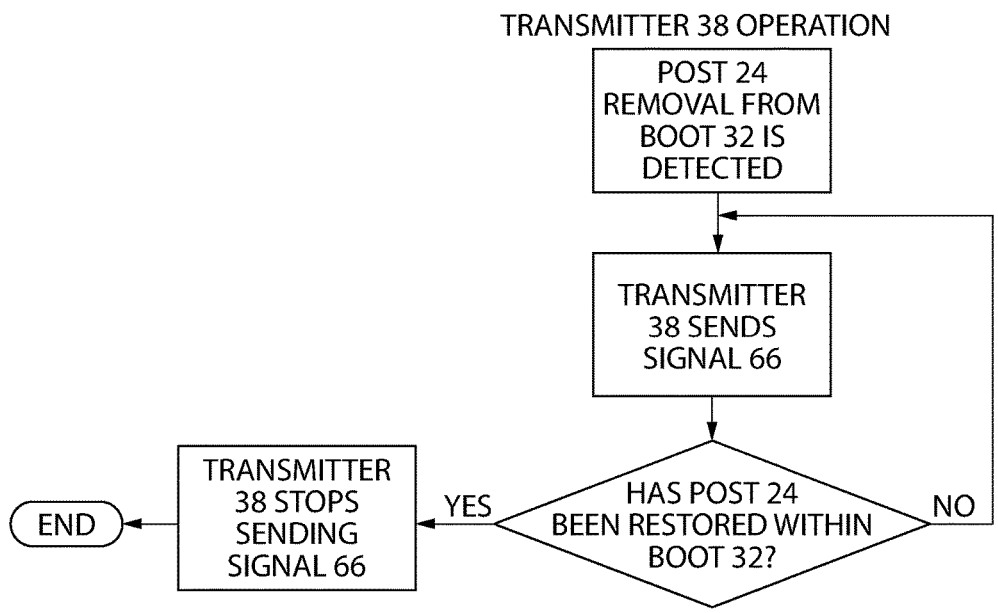
FIG. 6 is a flow diagram of the operation of the transmitter of the present invention.
Figure 7:
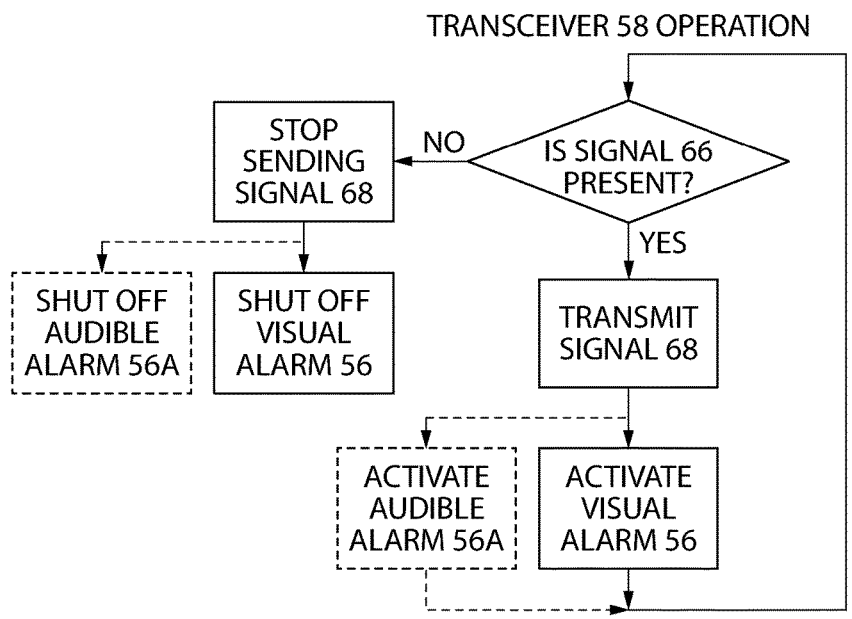
FIG. 7 is a flow diagram of the operation of the transceiver of the present invention.
Figure 8:
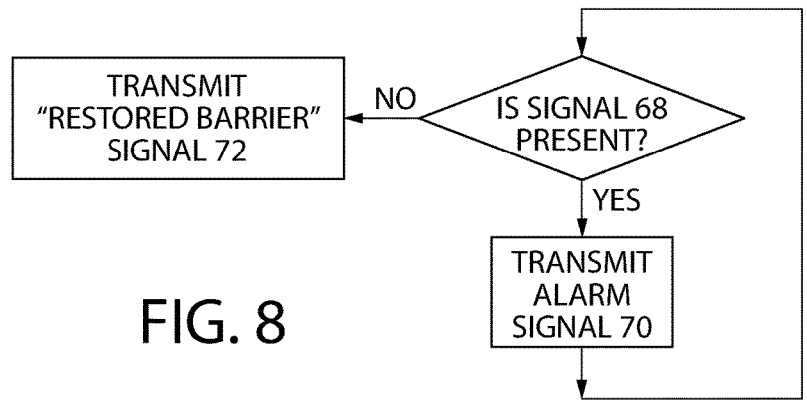
FIG. 8 is a flow diagram of the operation of the on-site controller of the present invention.

By way of example only, another housing 54 (e.g., a casing having a lid that can be locked, e.g., SE300 protective casing by Seahorse Protective Equipment of LaVerne, Calif.) is provided on the post 22, it being understood that the housing 54 could just as easily be positioned on some other portion of the barrier 20A. The housing 54 comprises a visual indicator/alarm 56 (e.g., a warning light such as a SECO-LARM SL-1301-BAQ LED strobe light, etc.; or alternatively, or in addition to, an audible indicator/alarm 56A (FIG. 4, e.g., Piezo buzzer-fast pulse tone, etc.)), a transceiver 58 (e.g., DMP-1116 wireless relay output control, etc.) and a battery 60 (FIGS. 4A-4B, e.g., Yuasa NP7-12/12V, 7.0 AH, lead acid battery, etc.). A padlock 62 is provided to lock the door 64 to the housing 54 to prevent tampering with the transceiver 58/battery 60/visual indicator 56; only authorized personnel have the key to unlock the padlock 62. The transceiver 58 is coupled to the battery 60 and is always listening to see if it receives a transmission from the transmitter 38. If someone were to remove the barrier 20A from the receptacles 30/32, as shown in FIG. 3, the transmitter 38 will transmit a wireless signal 66, as shown in FIG. 3A, and the transceiver 58 (in the housing 56) will receive the wireless signal 66. At that time, the transceiver 58 will activate (see FIG. 3) the visual indicator 56 (and/or the audible alarm 56A) to provide a "local" alert to those in the near vicinity that the barrier 20A has been removed. Simultaneously, the transceiver 58 will transmit its own wireless signal 68 (FIG. 4A) to the on-site controller 20B (which is also always listening), which, in turn, will transmit alert warnings 70 (e.g., text messages, etc.; see FIG. 9) that a particular barrier 20A (e.g., barrier "McB4" has been removed to wireless devices 20C of authorized personnel that are on the site and even off the site (if the power range permits). These warning signals 70 may be transmitted continuously, periodically or in any manner that the system operators wish to establish. FIG. 6 depicts a flow diagram of the transmitter 38 operation while FIG. 7 depicts the transceiver 58 operation. FIG. 8 depicts the on-site controller processor 16 (FIG. 5) operation.

Figure 9:
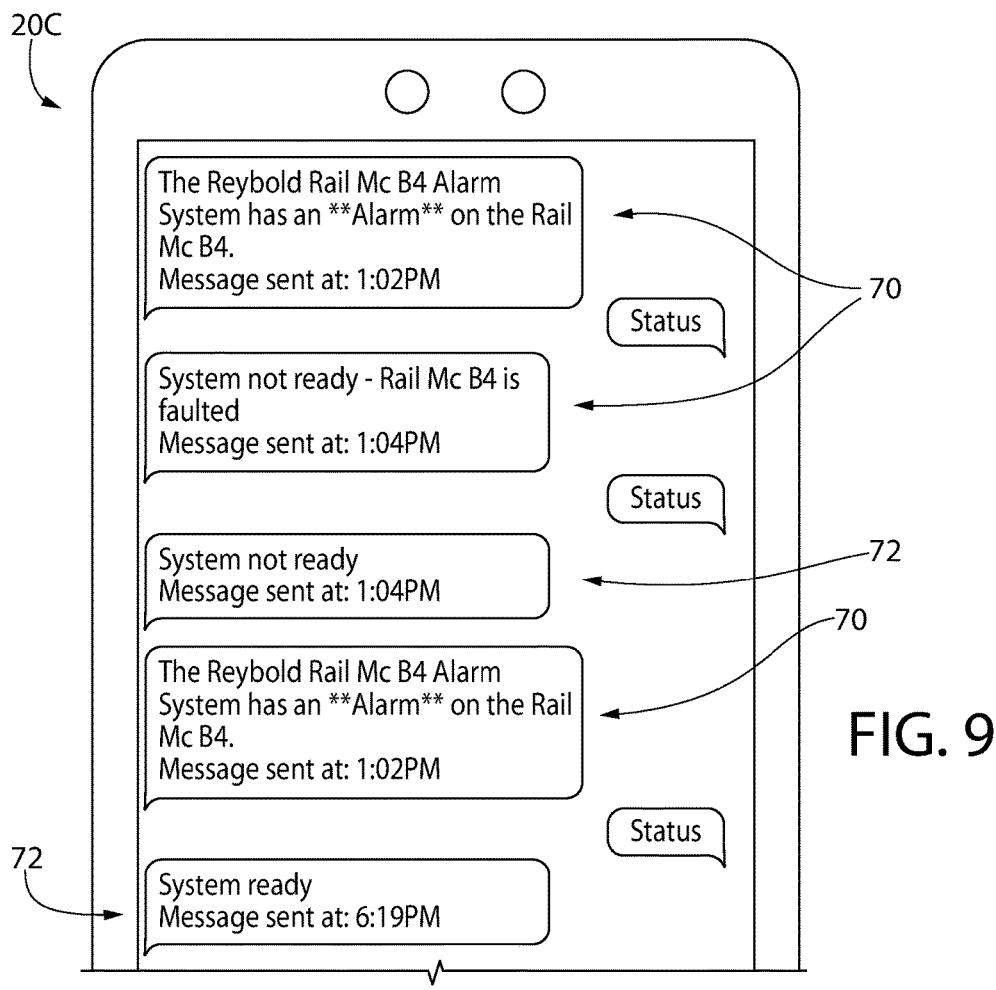
FIG. 9 is a partial view of a display screen view of a wireless device showing the alert signal message and the restored signal message.

Upon receiving these warning signals 70, these authorized personnel can then take appropriate action to secure the balcony opening 10. Certainly, contractors authorized to work on the balcony may be permitted to remove the barrier 20A to conduct appropriate work at the balcony location, in which case the authorized personnel are aware that the barrier 20A has been removed for valid reasons. However, the alert warnings 70 will continue to the authorized personnel until the barrier 20A is actually restored (as shown in FIGS. 2-2A). As shown in FIG. 4B, once the post 24 is restored in the boot 32, in that instance, the transmitter 38 stops sending its signal 66, which causes the transceiver 58 to deactivate the visual alarm 56 (and/or audible alarm 56A), while terminating its own transmitted signal 68. Once the on-site controller 20B no longer receives the signal 68, the on-site controller 20B issues a "restored barrier" signal 72, as shown in FIGS. 4B and 9 (viz., "system ready" indication). Again, this "restored barrier" signal 72 can be sent continuously, periodically or in any manner transmitted by the system operator while the post 24 remains in the boot 32.

FIG. 9 depicts an exemplary wireless device 20C screen display of a typical BASAS 20 operation. As shown, a particular barrier 20A (identified as "McB4") has been removed from its boots 30/32, thereby alerting the wireless device 20C of this authorized person that the barrier 20A was removed at 1:02 pm. Two minutes later (by way of example only) another alert message 70 indicates that the barrier 20A is system ready message 72 is sent, indicating that the barrier 20A (viz., "McB4") has been restored. As mentioned previously, it is up to the system operator to determine how often the alert signal 70 and/or the system ready signal 72 are sent to the authorized personnel. In this example, at 1:34 pm the barrier 20A ("McB4") is again removed and the authorized personnel wireless devices 20C are alerted. A "system ready" signal 72 is sent at 6:19 pm to the wireless devices 20C. Again, because the system operator can set the frequency of warning signals 70 and system ready signals 72, this can allow the system operators to avoid nuisance warnings if, for example, the removed barrier 20A is clearly in everyone's sight and the need to "warn" the authorized personnel of the removed barrier 20A is not as critical.

By way of example only, the upper cross beam 26 may be located on the vertical posts 22/24 at a height of 42 inches from the floor while the lower cross beam 28 may be located on the vertical posts 22/24 at a height of 19 inches from the floor 14.

To make the removal of the barrier 20A from the receptacles 30/32 slightly more difficult, a releasable securing mechanism (e.g., a cotter pin, a tamper-proof threaded fastener, etc.) may be installed through the receptacle 30/post 22 (and/or through receptacle 32/post 24). Thus, to remove the barrier 20A, the releasable securing mechanism would need to be disengaged first before removing the barrier 20A.

As mentioned previously, the on-site controller 20B may comprise a DMP-XTLC-Wireless Control Panel, by way of example only. As shown in FIG. 5, the DMP-XTLC-Wireless Control Panel comprises a local wireless receiver 14, a controller processor 16 and a cellular network transmitter 18 (e.g., CDMA cellular compatible configuration and frequency band(s)) the latter of which permits messaging features (e.g., the messages 70 and 72) with the wireless communication devices 20C (e.g., cell phone), as well as the capability (e.g., a keypad/display, not shown) for authorized system operators to control the frequency of messages 70 and 72, as described previously. The on-site controller 20B is housed in a rugged casing (not shown).

The transmitter 38 and the transceiver 58 may operate in the 905-924 MHz or 2.4 GHz frequency bands (and preferably using spread spectrum techniques) for providing reliable transmissions 66 and 68.

While the invention has been described in detail and with reference to specific examples thereof, it will be apparent to one skilled in the art that various changes and modifications can be made therein without departing from the spirit and scope thereof.

What is claimed is:

1. A barrier status alert system for use at a position adjacent an opening frame to a balcony to alert at least one authorized personnel, remote from the balcony, that a barrier has been removed from the position, said system comprising:
    the barrier that is configured to be installed or removed from the position and wherein the barrier is uncoupled to the opening frame when installed, said barrier preventing passage of a person through the opening frame;
    a detector that transmits a first wireless signal whenever a portion of the barrier has been removed from the position, said detector being positioned on a receptacle secured to a floor at said position, said receptacle receiving a support of said barrier;
    a transceiver which receives said first wireless signal, said transceiver transmitting a second wireless signal to an on-site controller; and
    said on-site controller transmitting a third wireless signal to at least one wireless device of the at least one authorized personnel indicating that said barrier has been removed.

2. The barrier status alert system of claim 1 wherein said at least one wireless device is a smartphone and wherein said third wireless signal is a text message alerting said at least one authorized personnel that said barrier has been removed.

3. The barrier status alert system of claim 1 wherein said on-site controller transmits a fourth wireless signal, in the absence of receiving said second wireless signal, to said at least one wireless device of the at least one authorized personnel indicating that said barrier has been restored.

4. The barrier status alert system of claim 3 wherein said at least one wireless device is a smartphone and said fourth wireless signal is a text message alerting said at least one authorized personnel that said barrier has been restored.

5. The barrier status alert system of claim 1 wherein said transceiver is positioned on said barrier.

6. The barrier status alert system of claim 1 further comprising an indicator associated with said barrier, said indicator controlled by said transceiver, said indicator alerting personnel in a local vicinity when said barrier has been removed.

7. The barrier status alert system of claim 6 wherein said indicator is a visual indicator.

8. The barrier status alert system of claim 6 wherein said indicator is an audible indicator.

9. The barrier status alert system of claim 1 wherein said position adjacent the opening frame is inside an upper level structure.

10. The barrier status alert system of claim 1 wherein said position adjacent the opening frame is on the balcony.

11. A method for providing a status alert of a barrier installed for use at a position adjacent an opening frame to a balcony in order to alert at least one authorized personnel, remote from the balcony, that the barrier has been removed from the position, said method comprising:

releasably securing the barrier at the position without coupling said barrier to the opening frame;

detecting the removal of the barrier from the position using a detector that detects a barrier support positioned within a receptacle that is secured to a floor at said position, said barrier preventing passage of a person through the opening frame when the barrier is present at the position;

transmitting a first wireless signal from said detector whenever said detector has detected removal of said barrier support from the receptacle;

receiving said first wireless signal by a transceiver wherein said transceiver transmits a second wireless signal to an on-site controller; and receiving said second wireless signal by said on-site controller wherein said on-site controller transmits a third wireless signal to at least one wireless device of the at least one authorized personnel indicating that said barrier has been removed.

12. The method of claim 11 wherein said at least one wireless device is a smartphone and wherein said third wireless signal is a text message alerting the at least one authorized personnel that said barrier has been removed.

13. The method of claim 11 further comprising the step of transmitting a fourth wireless signal by said on-site controller, in the absence of receiving said second wireless signal, to said at least one wireless device of the authorized personnel indicating that said barrier has been restored.

14. The method of claim 13 wherein said at least one wireless device is a smartphone and wherein said fourth wireless signal is a text message alerting the at least one authorized personnel that said barrier has been restored.

15. The method of claim 13 wherein a frequency of the transmission of said third and fourth wireless signals is configured to be altered.

16. The method of claim 11 wherein said transceiver is positioned on said barrier.

17. The method of claim 11 wherein said step of transmitting a second wireless signal further comprises activating an indicator associated with said barrier, said activated indicator alerting personnel in a local vicinity when said barrier has been removed.

18. The method of claim 17 wherein said step of activating an indicator comprises activating a visual indicator.

19. The method of claim 17 wherein said step of activating an indicator comprises activating an audible indicator.

20. The method of claim 11 wherein said position adjacent the opening frame is inside an upper level structure.

21. The method of claim 11 wherein said position adjacent the opening frame is on the balcony.

\* \* \* \* \*